Patented Dec. 12, 1933

1,939,218

UNITED STATES PATENT OFFICE 1,939,218

ACYLAMINO-ANTHRAQUINONES AND PROCESS OF PRODUCING THE SAME

Rhys Jenkins Loveluck and John Thomas, Grangemouth, Scotland, assignors to Imperial Chemical Industries Limited, a corporation of Great Britain No Drawing. Application March 19, 1932, Serial No. 600,063, and in Great Britain March 30, 1931

17 Claims. (Cl. 260—60)

This invention relates to aminoanthraquinone derivatives, more particularly arylsulfonamido-acylamino-anthraquinones and amino-acyl-amino-anthraquinones, and a process for the manufacture thereof.

As is well known, amino-acylamino anthraquinones are important dyestuffs intermediates, being used, for example, in the manufacture of acylaminodianthramides. Thus, 1-amino-5-benzoylaminoanthraquinone is employed in the manufacture of 5:5'-dibenzoyldiamino-1:1'-dianthrimide. Heretofore, these 1-amino-5-acylamino-anthraquinones have been difficult to obtain.

It is an object of the present invention to provide a new and improved process for producing amino-acylamino-anthraquinones. A further object is the production of alpha-amino-alpha-acylamino-anthraquinones and especially the amino-benzoylamino-anthraquinones of this class. A more specific object is the production of 1-amino-5-benzoylamino-anthraquinone. Further objects are the production of arylsulfon-amido-acylamino-anthraquinones and substituted derivatives thereof and in general to advance the art. Other objects will appear hereinafter.

These objects are accomplished according to a series of reactions whereby (1) arylsulfonamido-acylamino-anthraquinones are produced, and (2) these compounds are treated with a hydrolyzing agent to remove the arylsulfonyl group or groups. This is preferably effected by acylating a halogen-amino-anthraquinone, then replacing the halogen by an arylsulfonamido group or groups by the action of an arylsulfonamide and treating the resultant arylsulfonamido-acylamino-anthraquinone with sulfuric acid at a relatively low temperature.

The invention will be further illustrated but is not limited by the following examples in which the parts are by weight.

Example I

This is an example of the preparation of 1-p-toluene-sulfonamido-5-benzoylamino-anthraquinone and its hydrolysis to 1-amino-5-benzoyl-amino-anthraquinone.

The preparation is carried out as follows:

Twenty parts of 1-chloro-5-benzoylaminoan-thraquinone are dissolved in 100 parts of o-dichlorobenzene at the boil. To the solution 20 parts of pure potassium carbonate, 0.2 parts of copper acetate, and 0.3 parts of cuprous chloride are added with good stirring. The temperature is raised to the boil and while still stirring 20 parts of p-toluenesulfonamide are added in 3 hours. At the end of these three hours, boiling is continued for 6 hours and the melt then cooled, steam-distilled to remove o-dichlorobenzene and the solid filtered off, washed thoroughly with water and dried. The yield is about 27 parts which is substantially 99% of theory. The resultant material may be purified by crystallization from nitrobenzene. The product consists of yellow needles having a nitrogen content of about 5.48% (theory 5.6%) and a melting point of 266–268° C. It is soluble in cold sulfuric acid giving an olive-green solution, which turns reddish-brown on slightly warming and darkens on heating further.

Hydrolysis may be carried out as follows:—

Ten parts of this product are slowly dissolved in 100 parts of 95% sulfuric acid, with stirring, while keeping the temperature below about 20° C. When addition is complete the temperature is raised to about 28° C. for a further hour, after which the product is drowned in water. The solid is isolated by filtration, washed acid free and dried. The yield is almost theoretical and the product has a nitrogen content of 8.15% as compared with the theoretical value of 8.18% and melts at 251–253° C.

The material when crystallized from nitrobenzene consists of reddish plates having a melting point of about 261° C. It is soluble in sulfuric acid to a reddish brown solution, which darkens on heating. After heating for some time and drowning in water, 1:5-diaminoanthraquinone is obtained.

Example II

This is an example of the preparation of 1-benzoyl-amino-4-p-toluenesulfonamido-anthraquinone and its hydrolysis to 1-amino-4-benzoyl-amino-anthraquinone.

Twenty parts of 1-benzoylamino-4-chloroan-thraquinone are dissolved in 100 parts of o-dichlorobenzene. To the solution, 16 parts of dry sodium acetate, 0.2 parts of copper acetate, 0.3 part of cuprous chloride and 20 parts of p-toluenesulfonamide are added. The mixture is then boiled gently for 18 hours. After cooling, the solvent is removed by steam distillation, and the solid matter isolated by filtration, washing and drying; or the charge in the preparation of the material may be filtered, instead of steam distilled. The product may be purified by crystallization from a suitable solvent such as, for example, o-dichlorobenzene or nitrobenzene.

The resultant product consists of bright red-crystals of M. P. 260°–262° C. It dissolves in sulfuric acid to a bluish red solution which turns redder on slight heating. On further heating for some time and drowning in water, 1:4-diaminoanthraquinone is formed.

Hydrolysis may be carried out as follows:

Five parts of 4-benzoylamino-1-p-toluenesulfonamidoanthraquinone are slowly added to 50 parts of 96–98% sulfuric acid, keeping the temperature below 20° C. The solution is then heated to 25° C. and kept at 24°–26° C. for 2 hours. On drowning, a reddish-blue product is obtained.

*Example III*

This is another example of the preparation of 1-benzoylamino-5-o-toluenesulfonamidoanthraquinone and its hydrolysis.

Thirty parts of 5-chloro-1-benzoylaminoanthraquinone are dissolved in 150 parts of nitrobenzene. To the solution 25 parts of sodium acetate, 0.3 part of copper acetate, 0.45 part of cuprous chloride, and 30 parts of o-toluenesulfonamide are added. The whole is heated to 185° C. and kept at this for 12–18 hours. The charge is cooled and filtered. The solid is washed with nitrobenzene, then with alcohol and water and dried.

The yield is about 88% of the theoretical. The product consists of yellow crystals of M. P. 252°–255° C. It may be further purified from nitrobenzene. The yellow crystals dissolve in sulfuric acid to an olive green solution, which turns straw colored on slight warming. On heating for some time and drowning in water, 1:5-diamino-anthraquinone is obtained.

Instead of nitrobenzene, o-dichlorobenzene may be used as solvent with good results.

Hydrolysis may be carried out as follows:

Twenty parts of 1-benzoylamino-5-o-toluenesulphonamidoanthraquinone are dissolved in 200 parts of sulfuric acid (96%) keeping the temperature below 20° C. The solution is then heated for 2 hours at 24°–26° C. and drowned in water.

The crude 1-amino-5-benzoylaminoanthraquinone so obtained is isolated by filtration, washing and drying, and has a melting point of about 245° C. It may be further purified from nitrobenzene.

*Example IV*

Benzenesulfonamide may be employed instead of the p-toluenesulfonamide in Example 1, a high yield of 1-benzoylamino-5-benzenesulfonamidoanthraquinone being obtained.

The product forms yellow plates from nitrobenzene. It dissolves in sulfuric acid to an olive green solution, turning yellowish brown on slight warming. On hydrolysis 1-benzoylamino-5-aminoanthraquinone is obtained, the product having a melting point of about 240°–242° C.

The halogen-acylamino-anthraquinone from which the arylsulfonamido-acylamino-anthraquinone is prepared may be obtained in any suitable manner. Thus, an amino-anthraquinone may be acylated and halogenated in a solvent or suspension medium and then condensed with an arylsulfonamide as herein described. If desired, the reactions may be effected in the same solvent.

In the preparation of 1-benzoylamino-5-aminoanthraquinone, the yields are theoretical or almost theoretical throughout when 5-chloro-1-amino-anthraquinone, obtainable by the process of U. S. Patent No. 1,863,265, is benzoylated, the product is condensed with p-toluene-sulfonamide and the resultant product is hydrolyzed in accordance with our invention.

In practicing the invention, the aryl portion of the arylsulfonamido group may be substituted or unsubstituted. Of the substituted arylsulfonamides, the alkyl substituted aryl derivatives are preferably employed. The amido portion of the arylsulfonamido group may likewise be substituted or unsubstituted. Good results are obtained when the amido group carries an N-alkyl substituent, in which case an acylamino-alkylamino-anthraquinone is produced on hydrolysis. It will be understood throughout the specification and claims that by aryl radicals or groups, we mean carbocyclic radicals, residues or nuclei such as, for example, those of the benzene, naphthalene, and anthraquinone series. The terms amido and amino refer to groups obtained by replacing one or more of the hydrogens of an ammonia group by organic radicals. It will be observed that these two terms have substantially the same meaning but for the sake of clearness, the term amido has been employed only in connection with sulfo- groupings.

In the condensation of the arylsulfonamide and the halogen-acylamino-anthraquinones certain materials are employed to combine with the hydrogen halide liberated. These materials are referred to as acid-binding agents. In general, any compound capable of combining with the hydrogen halide set free without otherwise harmfully affecting the reaction may be employed. Of this class of compounds, we prefer to employ the alkaline carbonates and acetates, particularly the alkali metal carbonates and acetates. Sodium and potassium carbonates and acetates are especially desirable for this purpose.

Certain catalysts are also preferably employed to aid the condensation. While any catalyst favorable to the condensation of a halogen and an amino group may be employed, generally speaking we prefer to employ as catalysts copper halide such as, for example, cuprous chloride and/or salts of copper which will react under the conditions of condensation to form chlorides of copper.

The solvent or suspension medium employed in the condensation may be any solvent or suspension agent which is inert to the reactants or does not affect the reaction unfavorably. Organic solvents are preferably employed, particularly nitrobenzene, dichlorobenzene, trichlorobenzene or mixtures of chloro-benzenes which are liquid at the condensation temperature.

While the invention is preferably applied to the production of amino-benzyl-amino-anthraquinones any other amino-acylamino-anthraquinones fall within its broader aspects. It will be understood that by acyl we means the residue of a carboxylic acid. Special mention may be made of acylamino-anthraquinones in which the acyl radical is an acetyl, anisyl or anthraquinonyl group.

As previously indicated we prefer to employ sulfuric acid as the hydrolyzing agent. The quantity and strength of the acid will depend largely upon the body which is to be hydrolyzed, as will also the time and temperature of the hydrolytic treatment, but for sulfonamido-benzoylamino anthraquinones about one hour's heating in 95% sulfuric acid at about 20°–30° is normally sufficient. A longer heating at a lower temperature may take the place of a shorter heating at a higher temperature. The hydrolysis can in some cases be effected at room temperature on standing for sufficient length of time.

As a hydrolyzing agent we may also employ weak oleum, for example oleum of about 5% strength, or we may also use chlorosulfonic acid.

The process is of value generally in its application to the production of arylsulfonamido-acyl-amino-anthraquinones and amino-acylamino-anthraquinones, and especially in its application to the production of 1-amino-5-benzoylamino-anthraquinone which has been difficult to obtain heretofore. The series of reactions involved proceed smoothly and with good yields. The products are valuable in the chemical industry, particularly for the production of dyes.

As many apparent and widely different embodiments of this invention may be made without departing from the spirit thereof, it is to be understood that we do not limit ourselves to the foregoing examples or description except as indicated in the following claims.

We claim:

1. Process for the production of alpha amino-acylamino-anthraquinones which comprises the treatment of alpha arylsulphon-amido-acylamino-anthraquinones with a hydrolyzing agent so as to remove only arylsulphonyl groups.

2. A process for the production of 1-amino-5-benzoylamino anthraquinone, which comprises treating 5-benzoylamino-1-p-toluenesulphonamidoanthraquinone in about 95% sulphuric acid at about 28° C.

3. Process for the production of aminoacyl-aminoanthraquinones comprising acylation of a 1-halogeno-5-amino-anthraquinone followed by condensation with an arylsulphonamide and subsequent removal of the arylsulphonyl group by hydrolysis.

4. Process according to claim 1, in which the arylsulphonamido group carries an N-alkyl substituent.

5. The process which comprises condensing an alpha halogen-acylamino-anthraquinone with an arylsulfonamide to form an alpha arylsulfonamido-acylamino-anthraquinone.

6. The process which comprises condensing an alpha halogen-acylamino-anthraquinone with an arylsulfonamide to form an alpha arylsulfonamido-acylamino-anthraquinone and treating said alpha arylsulfonamido-acylamino-anthraquinone with a hydrolyzing agent.

7. The process which comprises condensing an alpha halogen-acylamino-anthraquinone with an arylsulfonamide to form an alpha arylsulfonamido-acylamino-anthraquinone and treating said alpha arylsulfonamido-acylamino-anthraquinone with a hydrolyzing agent at a temperature below about 30° C.

8. The process which comprises reacting upon an alpha-halogen-alpha-acylamino-anthraquinone with an arylsulfonamide in an inert liquid medium and in the presence of an acid-binding agent and a catalyst favorable to the condensation of the halogen and amido groups whereby an arylsulfonamido-acylamino-anthraquinone is formed.

9. The process which comprises reacting upon an alpha-halogen-alpha-acylamino-anthraquinone with an arylsulfonamide in an inert liquid medium and in the presence of an acid-binding agent and a catalyst favorable to the condensation of the halogen and amido groups whereby an arylsulfonamido-acylamino-anthraquinone is formed and treating said arylsulfonamido-acylamino-anthraquinone with a hydrolyzing agent to remove only the arylsulfonyl group or groups.

10. The process which comprises reacting upon 1-chloro-5-benzoylamino-anthraquinone with a toluenesulfonamide in an inert liquid medium and in the presence of an acid-binding agent and a catalyst favorable to condensation of the chlorine and amido groups whereby a toluenesulfonamido-5-benzoylamino-anthraquinone is formed.

11. The process which comprises reacting upon 1-chloro-5-benzoylamino-anthraquinone with a toluenesulfonamide in an inert liquid medium and in the presence of an acid-binding agent and a catalyst favorable to condensation of the chlorine and amido groups whereby a toluenesulfonamido-5-benzoylamino-anthraquinone is formed and treating said toluenesulfonamido-5-benzoylamino-anthraquinone with a hydrolyzing agent to remove only the toluenesulfonyl group or groups.

12. The process which comprises reacting upon 1-chloro-5-benzoyl-amino-anthraquinone with para-toluenesulfonamide in a dichlorobenzene and in the presence of copper acetate, cuprous chloride, and potassium carbonate.

13. The process which comprises reacting upon 1-chloro-5-benzoylamino-anthraquinone with para-toluenesulfonamide in a dichlorobenzene and in the presence of copper acetate, cuprous chloride, and potassium carbonate and treating the solid product with sulfuric acid at a temperature of about 20–30° C.

14. The process which comprises dissolving about 20 parts of 1-chloro-5-benzoylamino-anthraquinone in 100 parts of boiling ortho-dichlorobenzene, adding about 20 parts of potassium carbonate, 0.2 parts of copper acetate and 0.3 parts of cuprous chloride to the solution with stirring, raising the temperature to the boil and while still stirring slowly adding about 20 parts of para-toluenesulfonamide, boiling a sufficient length of time for the reaction to become substantially complete, and recovering the solid product.

15. The process which comprises dissolving about 10 parts of the product of claim 14 in 100 parts of 95% sulfuric acid at a temperature of about 20° C., maintaining a temperature within the range of about 20–30° C. a sufficient length of time for hydrolysis to become substantially complete, drowning the product in water, and recovering the solid product.

16. As new products alpha arylsulphonamido-acylamino-anthraquinones.

17. As new products alpha arylsulphonamido-acylamino-anthraquinones in which the arylsulphonamido group carries an N-alkyl substituent.

RHYS JENKINS LOVELUCK.
J. THOMAS.